May 26, 1970     A. L. CARTER ETAL     3,513,982

FILTER ARRANGEMENT

Filed May 1, 1967     2 Sheets-Sheet 1

ARTHUR L. CARTER
DONALD FORSTER
INVENTORS

BY

ATTORNEYS

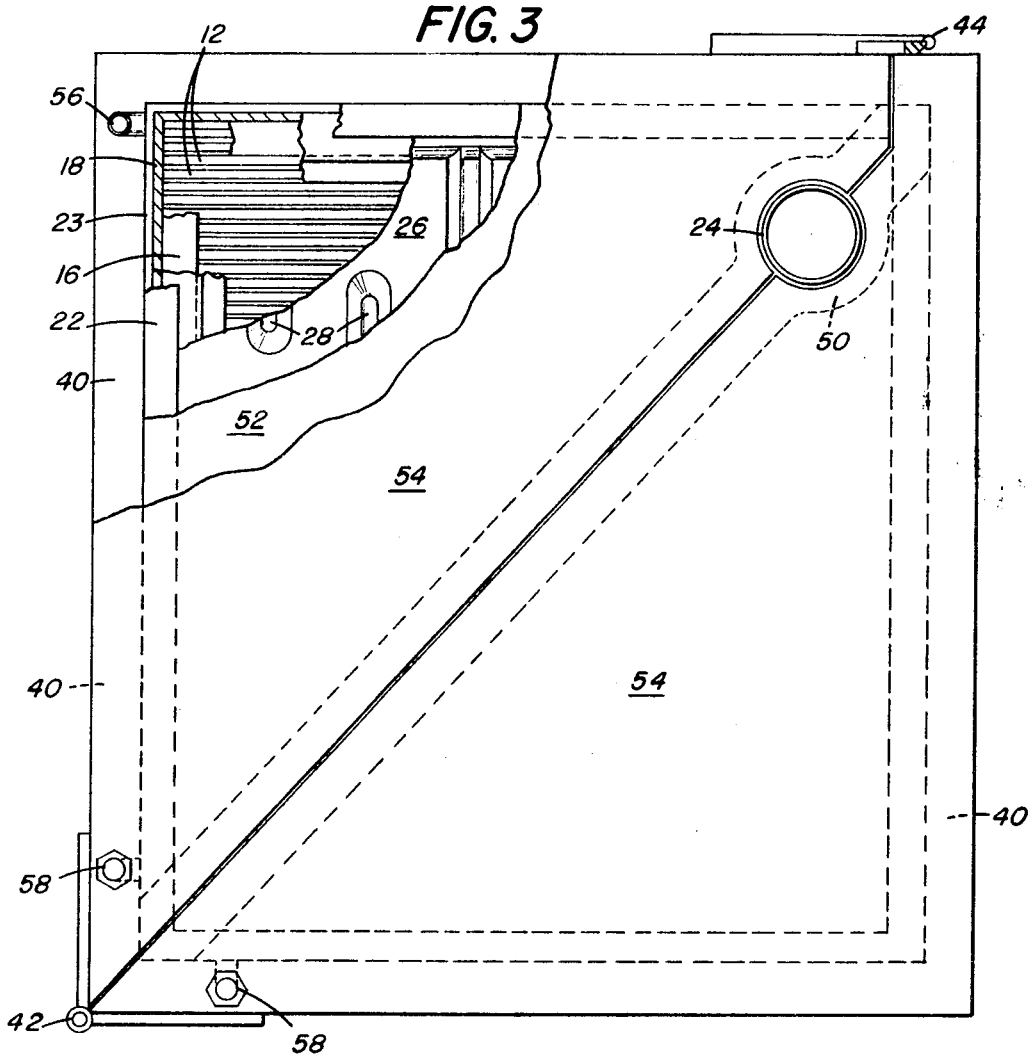
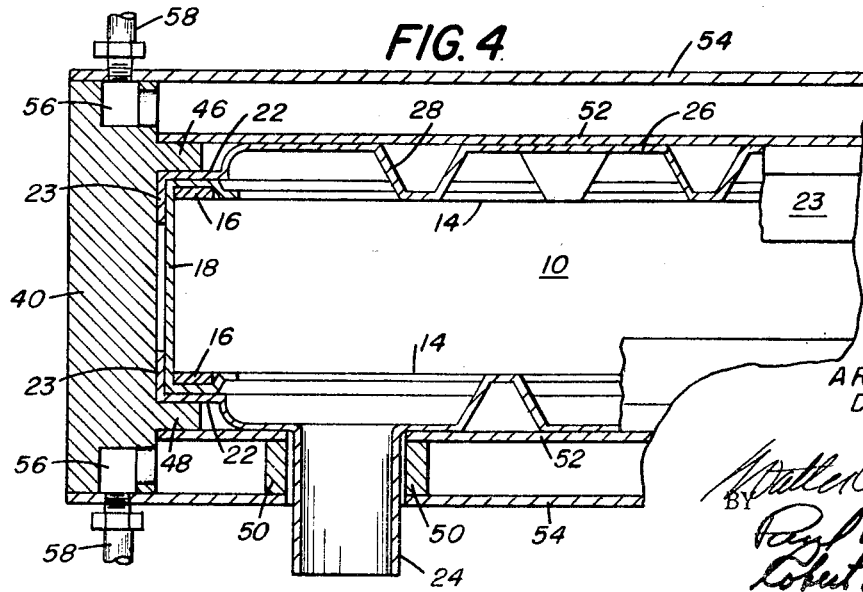

United States Patent Office 3,513,982
Patented May 26, 1970

3,513,982
FILTER ARRANGEMENT
Arthur L. Carter and Donald M. Forster, Rochester,
N.Y., assignors to Eastman Kodak Company, Rochester, N.Y., a corporation of New Jersey
Filed May 1, 1967, Ser. No. 635,216
Int. Cl. B01d 27/06
U.S. Cl. 210—435                                                    7 Claims

ABSTRACT OF THE DISCLOSURE

A filter formed of pleated filter paper having an integrally molded edge seal and oppositely arranged plastic end caps sealed to the filter paper. The end caps do not meet at the edge of the filter paper thereby reducing the possibility of liquid bypassing the filter.

BACKGROUND OF THE INVENTION

Many processes, including pharmaceutical, chemical and photographic processes, require complete filtration of the product either during production or prior to use. Plate and frame-type filter presses and cartridge-type filters are often used in the lines carrying the fluid to be filtered. The plate and frame-type filter press is well known in the art and comprises a plurality of sheets of filter material disposed between and supported by a plurality of stacked frames and plates. Such filters must be periodically disassembled to replace the filter paper and to clean the frames and plates. In order to permit this, it may be necessary that several complete filter presses be available for a single system so that one press may be in operation while the others are being cleaned and reassembled. The use of such filter presses also requires extensive manpower to disassemble, clean and reassemble, substantially contributing to the cost of utilizing such filters. A more significant factor in operations requiring complete filtration of the fluid is the possibility that such filter presses may be misassembled, resulting either in a shutdown of the process or less than complete filtration of the fluid, either of which may be undesirable. Moreover, the cost of using filter presses has often been so high, and their capacities so low, as to preclude their use in filtration of large volumes of fluids.

Filter cartridges are sometimes used comprising a central tube about which an annulus of a pleated or corrugated porous sheet of filter paper is formed with the pleates extending parallel to the axis of the annulus. This type of a cartridge is commonly placed in a cylindrical casing with the liquid to be filtered surrounding the annulus and passing inwardly through the porous sheet to the central tube, from which it leaves the filter casing. In such a construction it is important to provide a closure in the form of a disc or cap at each end of the annulus so that the liquid to be filtered cannot pass around these ends. Experience has shown that the filter casings are difficult to clean when the filter member is removed and that the possibility of misassembly still exists. Moreover, such cylindrical filters cannot be operated under high pressure-drop conditions, such as found in high flow rates, because the innermost pleats tend to be pinched off by the high pressure differential thereacross, reducing the effective filter size and the filtering capacity.

The ability to completely clean a system becomes of major importance when the system is used for making or processing various products, many of which may damage the others should traces of them remain in the system because of incomplete cleaning during product changeover. Filter presses and cartridge filters of the prior art have been found to be some of the more difficult portions of such systems to completely clean.

As a result, a completely disposable filter is a highly desirable objective since no cleaning would be required nor would there be any likelihood of misassembly which might cause processing shutdowns or failure to filter the fluid.

SUMMARY OF THE INVENTION

Accordingly, the present invention provides a filter element in which a sheet of filter paper, or other porous or permeable membrane filter material, is folded into zigzag pleats extending from one of two opposite edges of the sheet to the other and forms a filter element having a pair of faces disposed in a pair of substantially parallel planes. The pleated element is provided with a peripheral coating which sealingly engages the periphery of each face and the side thereof. The filter element is disposed between and is sealed to a pair of end caps.

Furthermore, the end caps are recessed in such a manner so as to provide fluid flow chambers for the flow of fluid to and from the filter material. The end caps are also arranged to provide structural support for each pleat or fold of the filter material.

In addition, the present invention provides a filter wherein the end caps do not meet at the side of the filter member so that there is no possibility of fluid bypassing the filter. Should any leakage occur between one end cap and the edge of the filter, the fluid drains to the surroundings rather than passing to the outlet side of the filter.

The end caps of the present filter are each provided with a tubular nipple for connection in the fluid system so that the entire filter may be readily disconnected and replaced by an entirely new filter. Inasmuch as the end caps may be formed of a relatively inexpensive plastic material, the entire filter and casing may be discarded, eliminating the time and cost of cleaning, assembly and handling of the filter cartridge and a separate container. The present arrangement furthermore eliminates the possibility of contamination of the product, and thereby its loss, by improper cleaning and/or mistakes in assembly.

In addition, the present filter arrangement, being disposed substantially in a plane rather than in a cylinder, reduces the resistance to fluid flow through the filter as well as the possibility of gas entrainment.

The present invention also provides a filter holder in which the filter may be quickly inserted, but which operates only to provide a structural backing for the end caps to permit operation of the filter under pressures in excess of atmospheric. Inasmuch as no part of the filter holder comes into contact with the fluid being filtered, there is no possibility that the filter holder can contribute to contamination, leakage, or misassembly problems.

The filter construction of the present invention has many advantages over filter constructions of the prior art, among which are positive end and side seals, support of the filter material at a number of points across the pleats, extremely low weight, considerably greater area of filtering material for a given volume of the filter assembly, and a sufficiently simple and inexpensive construction such that the entire filter assembly may be discarded after use, eliminating any necessity of cleaning, assembly and disassembly and reducing the possibility of misassembly and possible failure of the filter during use.

The various features of novelty which characterize the present invention are pointed out with particularity in the claims annexed to and forming a part of this specification. For a better understanding of the invention, its operating advantages and the specific objects obtained by its use, reference should be had to the accompanying drawings and descriptive matter in which the preferred embodiments of the present invention are illustrated and described.

BRIEF DESCRIPTION OF THE DRAWINGS

FIG. 3 is an elevation, partly in section, of a filter holder and filter element incorporating a further embodiment of the present invention; and FIG. 4 is an enlarged sectional detail of the assembly shown in FIG. 3.

DESCRIPTION OF THE PREFERRED EMBODIMENT

Figure 1:
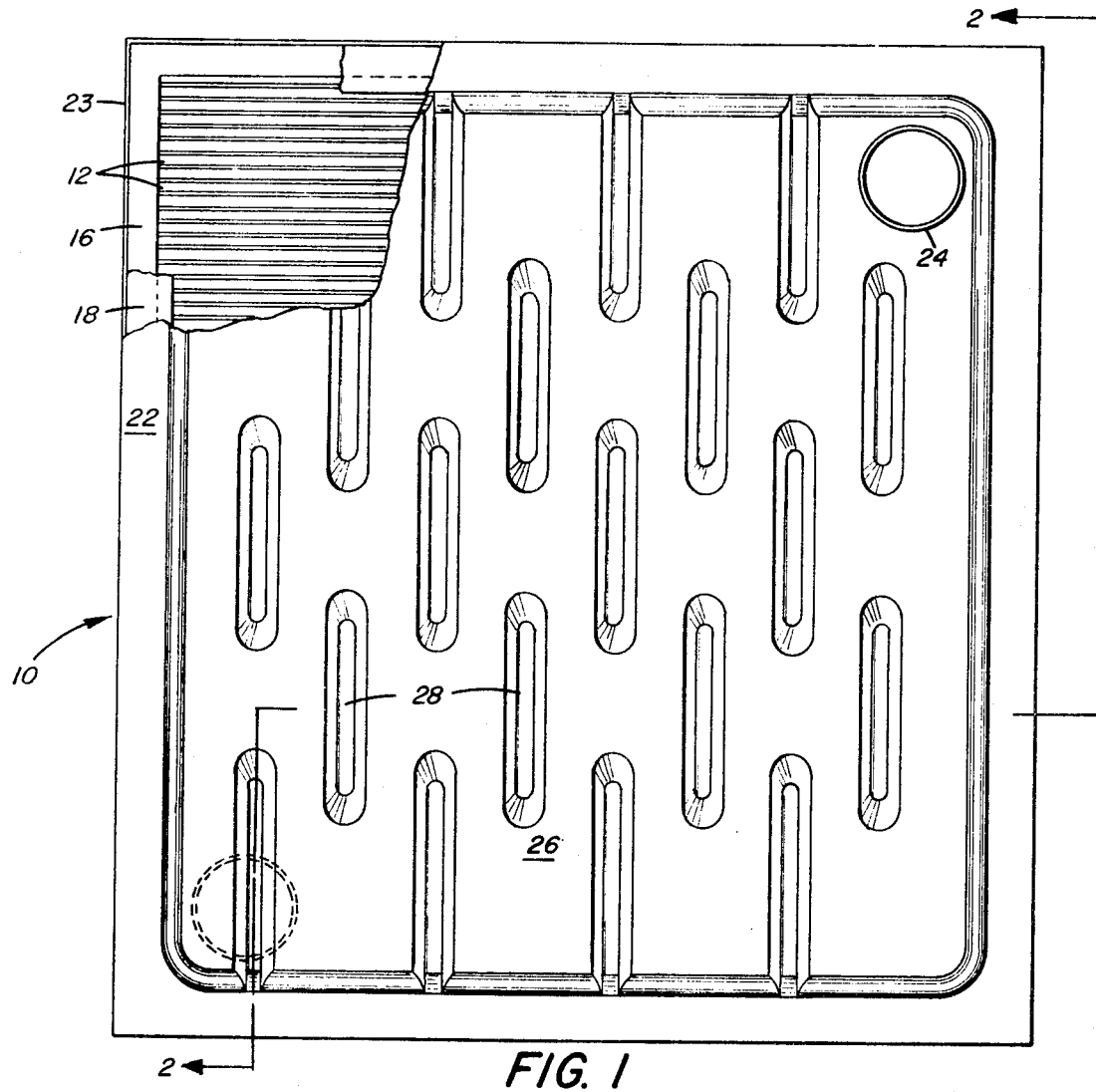
FIG. 1 is an elevation, partly in section, of a filter element incorporating a specific embodiment of the present invention.
Figure 2:
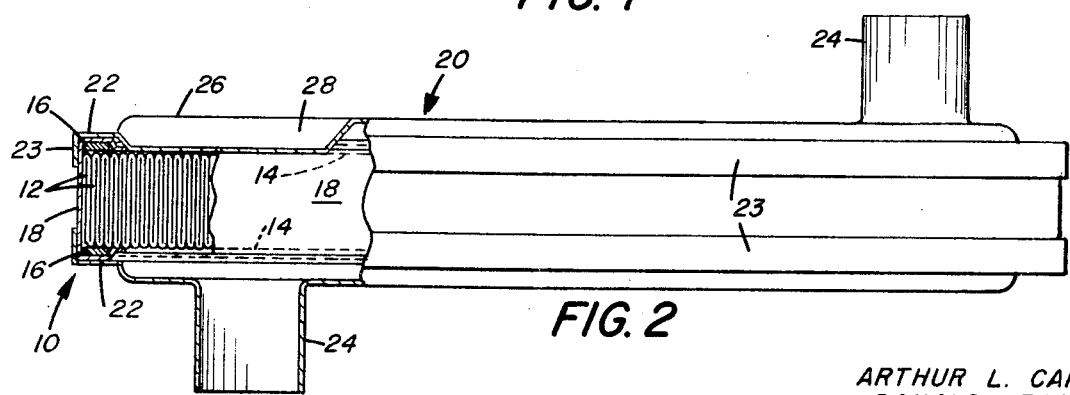
FIG. 2 is a view of the filter element taken along line 2—2 of FIG. 1.

As best seen in FIGS. 1 and 2, the filter element 10 of the present invention comprises a sheet of filter paper, or other porous or permeable membrane material, which is folded to form a plurality of parallel pleats 12 arranged substantially perpendicular to the major faces 14 of the filter element and extending from one of two opposite edges of the sheet to the other. The filter paper may be a single layer of any filtering material well known in the art or multiple layers of any filtering material, also well known in the art. The peripheral edge of each face 14 of the filter element 10 is bordered by a strip of a stiffening material 16 which is attached to the face of the filter paper, as by an adhesive. This strip material serves to define the edges of the face of the filter element and holds it in the desired configuration. Furthermore, the strips act to provide dimensional stability to the filter during fabrication, as will be more thoroughly described hereinafter. A film or coating 18, of an impermeable inert material such as a plastic, extends from just inside the strip 16, over the strip and around the side of the filter material and over the opposite strip 16 to the opposite face of the filter member, as is clearly shown in FIGS. 2 and 4. This plastic material may be applied in such a way that it sealingly engages both the filter material and the border strips 16 with which it comes into contact, to form a liquid-tight seal therewith. As a result, no liquid entering one face of the filter element can bypass the filtering action by flowing around the peripheral edges of the filter material.

An end cap 20, formed of a semi-rigid, molded plastic material, is provided for each face of the filter element. Each end cap is arranged with a substantially planar outer periphery 22 which is arranged to correspond to and engage the outer surface of the plastic film 18 disposed on the face of the border strip 16. The end caps are also provided with a peripheral lip 23 which extends around the side of the filter element. Each end cap is provided with an integrally formed nipple 24, which may be connected to the system in which the filter is disposed to provide the feed and discharge to and from the filter. The major face 26 of each end cap is spaced from the surface 14 of the filter element and cooperates therewith to provide fluid flow chambers for fluid flow to and from the filter. A plurality of ribs 28 project inwardly from the outer face of the end cap and extend transversely of the pleats of the filter member to provide support therefor. As seen in FIG. 1, these ribs are staggered so as to minimize the resistance to liquid flow in the inlet and outlet chambers. It will be noted that with the use of these ribs 28, no pleat of the filter material must span any substantial distance with the attendant possibility of crimping or bulging, and the accompanying problems of flow restriction or filter material rupture. Furthermore, while not readily apparent from the illustrations, the filter element may be constructed in rectangular rather than square form so that, during assembly, there is no possibility that the end cap may be rotated 90° from its intended position, with the resultant elimination of rib support for a major portion of the filter pleats.

Each end cap is sealingly joined to the filter member at the outer surface of the border strips 16. It will be noted that the edges 23 of the end caps are purposely sized so that they do not meet or overlap at the side of the filter. In this manner, should any failure occur in the seal between the end cap and the border strip, the fluid being filtered will not bypass the filter but will escape harmlessly to the surrounding environment.

The filter of the present invention may be fabricated by the following method. First, the filter material is cut to size and is folded or pleated; it is then gathered or compressed to the desired size and the border strips are sealed to the periphery of the faces of the filter element holding it in that configuration. The formed filter element may then be dipped into a molten plastic material such as molten acetate-butyrate. The filter is dipped, one side at a time, to a depth sufficient to overlap the border strips 16 on both faces, substantially as illustrated, to form the sealing coating or film 18. It will be noted that the border strips assist in maintaining the finished size of the filter element during the coating process since they counteract the tendency of the molten plastic to contract the filter material as it cools and solidifies. Furthermore, the border strips 16 provide a flat sealing surface for later connecting the end caps to the filter element, thereby improving the quality of the seal achieved. The filter element may be dipped twice or more into the molten plastic to achieve the desired final coating thickness. After the final application of molten plastic has cooled, the filter material element may be bubble tested for defects. It is then flushed and dried and two previously cleaned end caps 20 are sealed to the surface of the border strips 16. As illustrated, the end caps are normally arranged with the nipples diagonally opposite each other to facilitate purging of gas from the interior of the filter when it is placed in operation.

It may desirable to operate the filter at fluid pressures substantailly above atmospheric pressure so that it may be necessary to utilize a filter holder similar to that shown in FIGS. 3 and 4. This holder comprises a pair of cooperating substantially triangular frame members 40 having an internal configuration substantially conforming to the outer periphery of the filter element. The frames are connected by a hinge 42 at one corner and mate along the diagonal sides. A simple latch 44 may be provided at the end of the diagonal separation opposite the hinge. The frames 40 are provided with a pair of flanges 46 which extend inwardly from the inner surface thereof to engage the outer periphery of both faces of the filter element, i.e. the outer periphery 22 of both end caps 20 of the filter element. Each diagonal portion of the frame is provided with an offset 50 adapted to accommodate the nipples 24 in the end caps. A pressure plate 52 is connected to the outer surface of flanges 46 and is arranged to be contiguous to the outer surface 26 of the end cap to provide support therefor. As a result, internal pressures of the fluid within the end caps are not borne solely by the semi-rigid end caps so that higher fluid pressures may be used than would otherwise be possible.

The filter holder illustrated is arranged so that the two halves may be opened about the hinge, and the filter dropped in. The two halves of the holder are then closed and latched and the tubing from the fluid system connected to the inlet and oulet nipples 24 of the filter end caps. While it may be that only one end cap of the filter would have to be provided with a pressure plate in low pressure systems, by utilizing a filter holder having two pressure plates, the necessity for predetermining the inlet and outlet side of the filter is eliminated since either chamber is sufficiently supported so that it can withstand the internal pressure.

The filter holder illustrated may be provided with a water jacket by the use of outer plates 54 and channels 56 in the holder frame 40. The water jacket may be appropriately supplied with heating or cooling fluid via nipples 58 in a manner well known in the art.

As previously noted, the filter assembly illustrated provides a total filter surface substantially equal to that provided in an ordinary press and frame type filter, but requires only a fraction of the volume. Moreover the construction of the present filter is such that the possibility of misassembly has been substantially eliminated. As a result, the possibility of filter failure and/or liquid bypassing has been reduced to a minimum.

Moreover, since the entire filter assembly may be disposed of following use, no cleaning and/or contamination problems are encountered. A concomitant advantage of the present filter is the substantial saving in time and cost previously necessary for disassembly, cleaning, and assembly of the filters of the prior art.

In addition, while the present filter has been described as being used in systems operated at pressures above atmospheric, it will be appreciated that the structural features of this filter may be equally advantageous in systems operated at pressures less than atmospheric.

The invention has been described in detail with particular reference to preferred embodiments thereof, but it will be understood that variations and modifications can be effected within the spirit and scope of the invention as described hereinabove and as defined in the appended claims.

We claim:

1. A filter element formed of a gathered pleated strip of filtering material, the gathered material defining a pair of spaced faces disposed in substantially parallel planes and having peripheral sides joining said faces, an impervious coating sealingly engaging the periphery of each face and the sides of said filter element, a first end cap connected to the periphery of said gathered material of said filter element and cooperating with one face thereof to form a fluid flow chamber, and a second substantially similar end cap connected to the periphery of said gathered material and cooperating with the other face of said filter element to form a second fluid flow chamber, each of said end caps having a peripheral edge extending over the sides of the filter element, the peripheral edges of said end caps terminate along the sides of the filter element and are spaced apart a portion of the thickness of the filter element to provide an escape path for any liquid escaping between the connection of each end cap to the respective periphery of the filter element and to eliminate any fluid flow paths between said first and second fluid flow chambers which by-pass the filtering material, said end caps having aperture means for fluid flow through said filter element and said fluid flow chambers.

2. The invention according to claim 1 wherein stiffening border strips sealingly engage the periphery of said faces of the filter element, and said impervious coating sealingly overlies the outer surface of said border strips and extends in sealing engagement to a portion of each exposed face of said filter element within said border strips.

3. The invention according to claim 2 wherein said end caps sealingly engage the coated outer surface of the border strips.

4. The invention according to claim 1 wherein the gathered material and the end caps are joined to form a unitary construction that is completely disposable.

5. The invention according to claim 1 wherein the peripheral edge of each end cap extends over the sides of the filter element a distance less than half the thickness of said filter element.

6. The invention according to claim 1 wherein the end caps are provided with a plurality of ribs extending inwardly therefrom which extend transversely of and provide support for said pleats.

7. The invention according to claim 1 wherein each end cap is provided with an integrally formed nipple for connection to a source of fluid.

References Cited

UNITED STATES PATENTS

| | | | |
|---|---|---|---|
| 1,193,335 | 8/1916 | Acheson | 210—445 X |
| 1,495,825 | 5/1924 | Von Gunten. | |
| 1,966,274 | 7/1934 | Wells | 210—445 X |
| 2,908,347 | 10/1959 | Roos | 55—497 X |
| 3,076,555 | 2/1963 | Jackson et al. | 210—493 |
| 3,133,847 | 5/1964 | Millington | 210—493 X |
| 3,293,830 | 12/1966 | McKinlay | 55—502 X |
| 3,002,870 | 10/1961 | Belgarde et al. | 210—446 X |

FOREIGN PATENTS 851,247 10/1960 Great Britain.

REUBEN FRIEDMAN, Primary Examiner

C. M. DITLOW, Assistant Examiner

U.S. Cl. X.R.

210—232, 493